United States Patent [19]

Urata et al.

[11] Patent Number: 4,730,296
[45] Date of Patent: Mar. 8, 1988

[54] LOADING DEVICE IN A DISC PLAYBACK DEVICE

[75] Inventors: Kazuo Urata; Takuya Tamaru, both of Hamakita; Yasuhiko Kamoshita; Mikio Ogusu, both of Hamamatsu, all of Japan

[73] Assignee: Nippon Gakki Seizo Kabushiki Kaisha, Hamamtsu, Japan

[21] Appl. No.: 781,768

[22] Filed: Sep. 30, 1985

[30] Foreign Application Priority Data

Oct. 3, 1984 [JP] Japan .................... 59-207608

[51] Int. Cl.$^4$ .................... G11B 25/04; G11B 17/04
[52] U.S. Cl. .................... 369/75.2; 369/77.2
[58] Field of Search ............ 369/75.1, 75.2, 77.1, 369/77.2

[56] References Cited

U.S. PATENT DOCUMENTS

| | | | |
|---|---|---|---|
| 4,513,409 | 4/1985 | Staar | 369/77.1 |
| 4,523,306 | 6/1985 | Staar | 369/77.1 |
| 4,592,040 | 5/1986 | Ohsaki | 369/77.1 |
| 4,625,304 | 11/1986 | Kanamaru et al. | 369/77.1 |
| 4,627,037 | 12/1986 | Tamaru | 369/77.2 |

Primary Examiner—Steven L. Stephan
Attorney, Agent, or Firm—Spensley Horn Jubas & Lubitz

[57] ABSTRACT

A disc loading device in a disc playback device comprises a turntable for rotating a disc thereon, a holder which is provided above this turntable for holding a disc or a case housing a disc and is capable of moving upwardly or downwardly with respect to the turntable and a carrier which is capable of moving horizontally with respect to the holder for loading the disc or the case into the holder or ejecting it from the holder. A cam is provided in the holder which cooperates with a hole formed in the carrier to move the holder upwardly or downwardly in loading and ejection of the disc or the case. A clamper may be provided on the holder for fixing the disc to the turntable.

10 Claims, 55 Drawing Figures

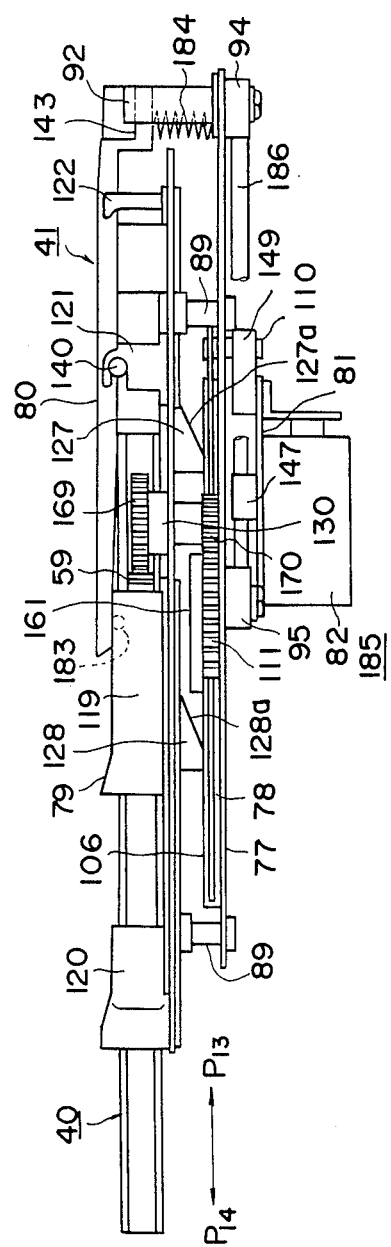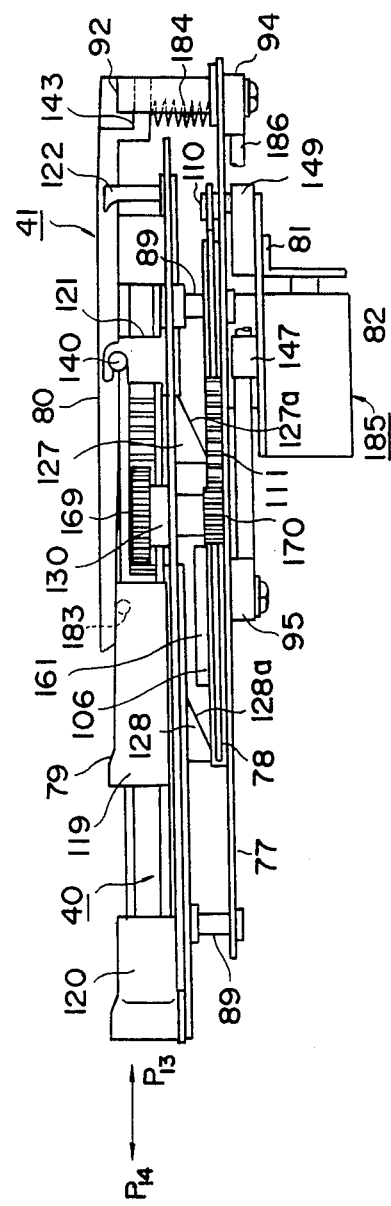

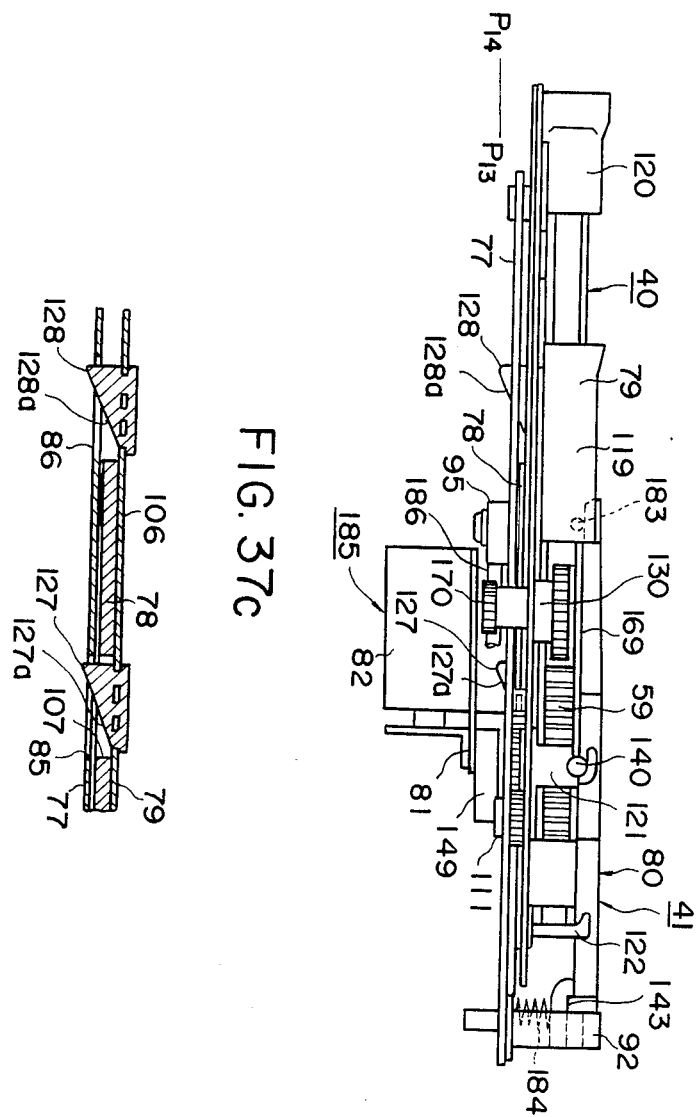

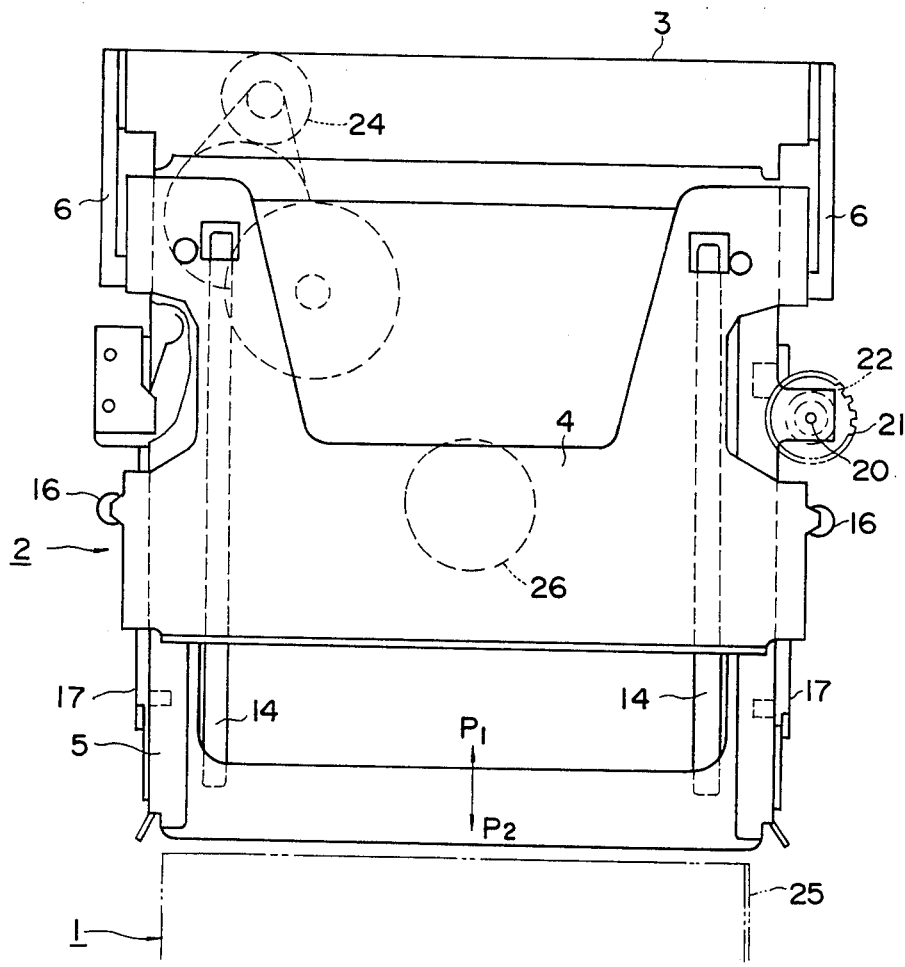
PRIOR ART FIG. 42
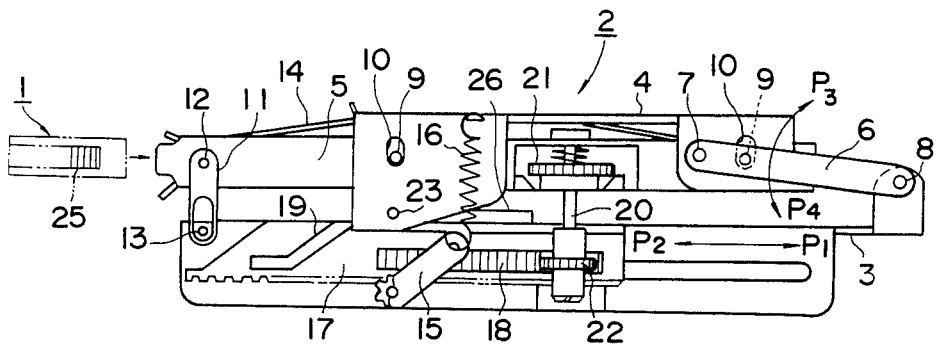
PRIOR ART FIG. 43

LOADING DEVICE IN A DISC PLAYBACK DEVICE

BACKGROUND OF THE INVENTION

This invention relates to a loading device in a disc playback device for playing a disc such as a Compact Disc for the Compact Disc Digital Audio System and an optical type video disc.

A disc playback device generally includes a turntable provided on the chassis for rotating a disc thereon and an operation for loading a disc on the turntable from outside of the device and an operation for taking out the disc from the turntable are both automatically performed. A loading device for performing such loading and taking out of the disc is generally constructed in such a manner that in loading (i.e., during moving of the disc from an eject position to the turntable), the disc is moved horizontally along the chassis towards the turntable and, upon reaching of the disc above the turntable, the disc is lowered and set on the turntable whereas in ejecting (i.e., during moving of the disc from the turntable to the eject position), the disc is lifted from the turntable and moved horizontally along the chassis towards the eject position.

It is a question in designing such loading device how smoothly the operation for horizontally moving the disc and the operation for lowering and lifting the disc relative to the turntable should be performed.

By way of example of the disc playback device including such loading device, description will be made about a device shown in FIGS. 42 and 43 which has been proposed in Japanese Patent Application No. 193525/1984. This disc playback device is of a type in which a disc case housing a disc is loaded in the device.

In FIGS. 42 and 43, reference numeral 1 designates a disc magazine case housing a disc therein and reference numeral 2 a main body of the device for playing the disc in the disc magazine case 1. A clamper 4 and a holder 5 are supported on the upper surface of a chassis 3 of the main body 2. The clamper 4 is supported in its rear end portion on the chassis 3 via an arm 6 and pins 7, 8. The holder 5 is supported by holes 10, 10 formed in the clamper 4 via pins 9, 9 and also supported on the chassis 3 via an arm 11 and pins 12, 13. A spring 14 is provided between the clamper 4 and the holder 5 and a spring 16 is provided between the clamper 4 and an arm 15 supported on the chassis 3. On the side surface of the chassis 3 is supported a carrier 17 which is movable in the direction of arrows P1, P2. A rack 18 and a cam 19 are formed on the carrier 17. A shaft 20 is supported on the holder 20 and a loading pinion 21 is supported on this shaft 20 with a portion thereof being present in the holder 5. A carrier pinion 22 is also fixed on the shaft 20 which is meshable with a rack 18. A pin 23 engaging with a cam 19 is fixedly secured to the holder 5.

In the above described construction, when the carrier 17 is moved in the directions of the arrows P1, P2 by a drive system including a motor 24, the carrier pinion 22 is rotated so that the loading pinion 21 is rotated. When the disc magazine case 1 is inserted in the holder 5, the loading pinion 21 is meshed with a rack 25 formed on the side on the case 1 and thereby moves the case 1 in the directions of the arrows P1, P2. In the meanwhile, when the carrier 17 has moved in these directions, the pin 23 is lowered or lifted following the cam 19 by the force of the spring 16. The lowering or lifting of the pin 23 causes the clamper 4 and the holder 5 supported on the clamper 4 to be lowered or lifted relative to a turntable 26 provided on the upper surface of the chassis 3.

In the above described manner, the prior art disc playback device can move the disc magazine case 1 horizontally (the directions of the arrows P1, P2) and also downwardly or upwardly with the holder 5 thereby performing loading and ejecting of the disc housed in the disc magazine case 1.

For lowering and lifting the holder 5, the prior art device has adopted the construction according to which the clamper 4 is moved by causing the pin 23 to follow the cam 19 and the holder 5 is lowered and lifted with the clamper 4. This necessitates a very complicated construction. Besides, since the clamper 4 supporting the holder 5 is supported on the chassis 3 via the arm 6, the arm 6 moves in a pivotal motion in the directions of arrows P3, P4 when the holder 5 is lowered and lifted. This causes the holder 5 to move in the directions of the arrows P1, P2 when it is lowered and lifted with a result that a large space is required for allowing the movement of the holder 5.

It is, therefore, an object of the present invention to provide an improved loading device in a disc playback device of a simplified and space-saving construction.

SUMMARY OF THE INVENTION

For achieving the above described object, the disc loading device in a disc playback device according to the invention comprises a turntable for rotating a disc thereon, a holder provided above this turntable for holding a disc or a case housing a disc and being capable of moving upwardly or downwardly with respect to the turntable, a carrier being capable of moving horizontally with respect to the holder for loading the disc or the case housing the disc into the holder or ejecting the same from the holder and a cam device provided in the holder and carrier for moving the holder downwardly in the loading of the disc or the case housing the disc and moving the holder upwardly in the ejection of the disc or the case housing the disc.

According to the invention, the holder is lifted and lowered through the action of the cam device provided in the holder and carrier and, accordingly, the loading and ejecting operations can be made simply by the horizontal and vertical movements of the holder holding the disc or the case housing the disc so that the construction of the disc loading device is greatly simplified. Besides, since the vertical movement of the holder is not accompanied by any pivotal movement of its constituent element, an accurate and smooth movement of the holder is ensured and saving of space is realized.

BRIEF DESCRIPTION OF THE DRAWINGS

In the accompanying drawings,

FIGS. 1 through 41 are views showing an embodiment of the present invention in which:

FIG. 1 is a side elevation of the disc playback device;

FIG. 2 is a plan view of the same device;

FIG. 3 is a bottom view of the same device;

FIG. 4 is an exploded perspective view of the same device;

FIG. 5 is a plan view of a chassis;

FIG. 6 is a sectional view taken along lines B—B in FIG. 5;

FIG. 7 is a sectional view taken along lines C—C in FIG. 5;

FIG. 8 is a sectional view taken along lines D—D in FIG. 5;

FIG. 9 is a sectional view taken along lines E—E in FIG. 5;

FIG. 10 is a bottom view of the chassis;

FIG. 11 is a plan view of a carrier;

FIG. 12 is a sectional view taken along lines F—F in FIG. 11;

FIG. 13 is a sectional view taken along lines G—G in FIG. 11;

FIG. 14 is a bottom view of the carrier;

FIG. 15 is a plan view of a holder;

FIG. 16 is a front view of the holder;

FIG. 17 is a side elevation taken along lines H—H in FIG. 15;

FIG. 18 is a sectional view taken along lines I—I in FIG. 15;

FIG. 19 is a sectional view taken along lines J—J in FIG. 15;

FIG. 20 is a sectional view taken along lines K—K in FIG. 15;

FIG. 21 is a sectional view taken along lines L—L in FIG. 15;

FIG. 22 is a sectional view taken along lines M—M in FIG. 15;

FIG. 23 is a bottom view of a clamper;

FIG. 24 is a sectional view taken along lines N—N in FIG. 23;

FIG. 25 is a sectional view taken along lines O—O in FIG. 23;

FIG. 26 is a sectional view taken along lines Q—Q in FIG. 23;

FIG. 27 is a sectional view taken along lines R—R in FIG. 23;

FIG. 28 is plan view of a head base;

FIG. 29 is a rear view of the head base;

FIG. 30 is an enlarged view of a portion indicated by reference character S in FIG. 28;

FIG. 31 is a view showing relative positions of a loading pinion and a rack of a disc magazine case;

FIG. 32 is an enlarged view of an essential portion of FIG. 31;

FIG. 34 is a perspective view of the disc magazine case in its closed state;

FIG. 35 is a perspective view of the disc magazine case in its opened state;

FIG. 36 is an exploded perspective view of the disc magazine case;

FIGS. 37a through 37c, FIG. 38, FIGS. 39a through 39f, FIGS. 40a through 40d and FIGS. 41a and 41b are views for showing the operation of the disc playback device.

FIG. 42 is a plan view of the prior art disc playback device; and

FIG. 43 is a side elevation thereof.

DESCRIPTION OF PREFERRED EMBODIMENT

FIGS. 1 through 41 show an embodiment of the present invention applied to a Compact Disc player.

A disc playback device (Compact Disc player) to be described below comprises a disc magazine case 40 for housing a disc such as a Compact Disc and a main body 41 of the device. The disc magazine case 40 in which a disc is exchangeably received is loaded in the main body 41 and the disc is played in a state in which it is received in the case 40.

Figure 34:
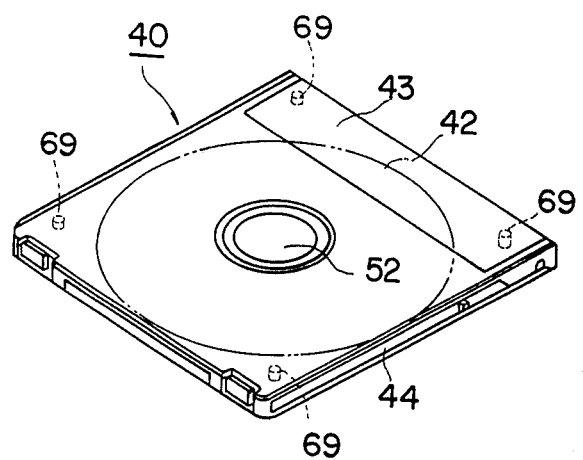
Figure 35:
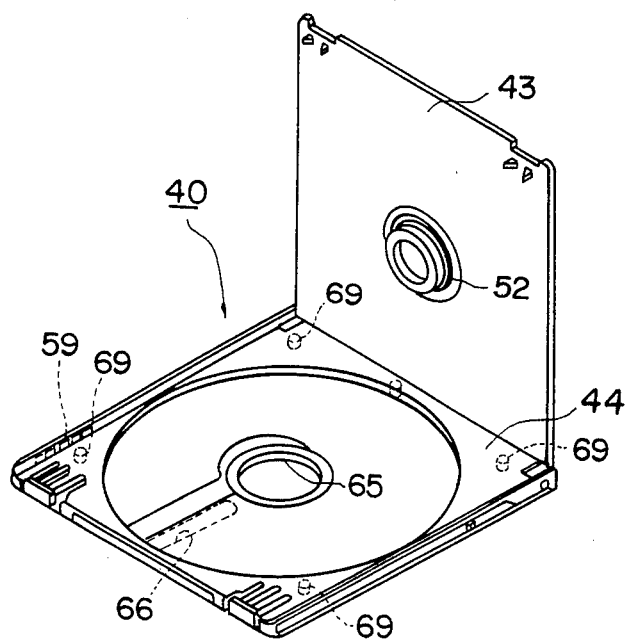
Figure 36:
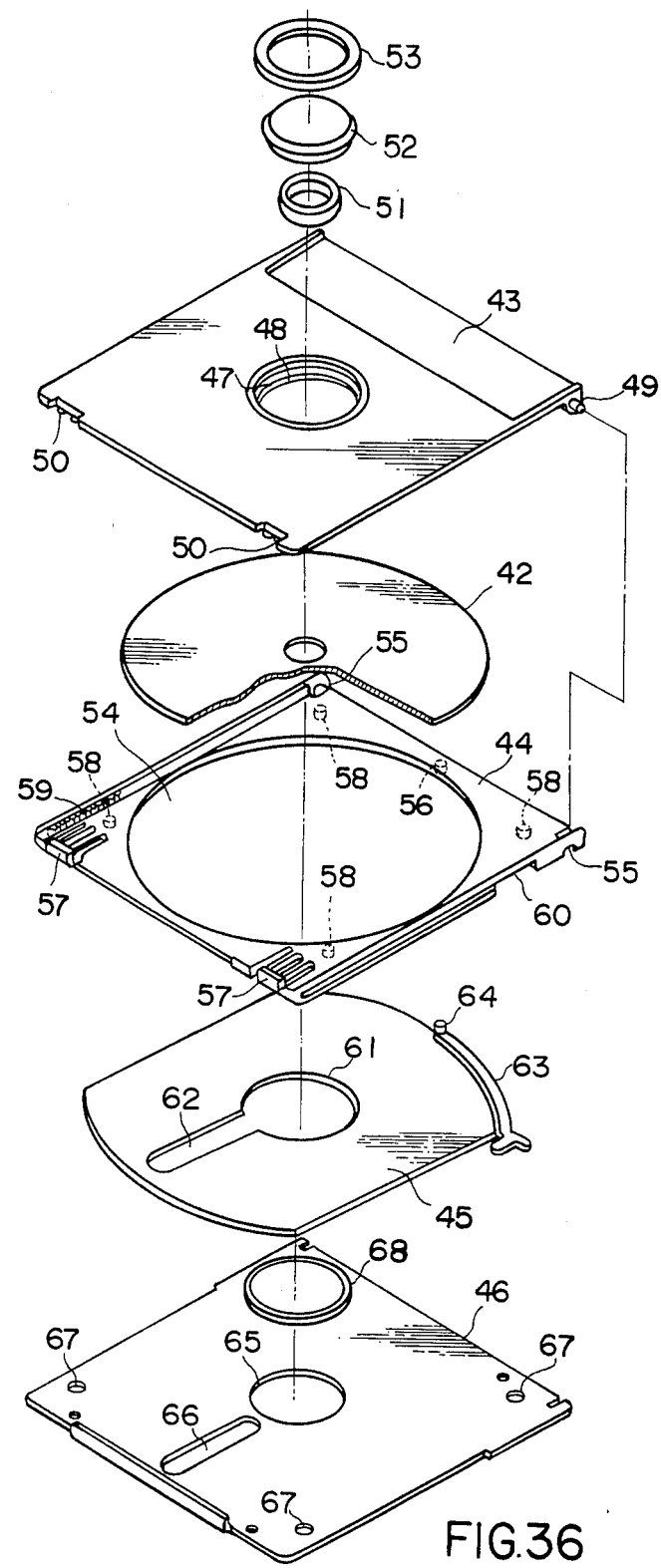

Construction of the disc magazine case 40 will first be described with reference to FIGS. 34–36. As shown in the figures, the disc magazine case 40 is of a plate-like configuration, oblong in its plan view and having a certain thickness in its closed state housing a disc 42. This disc magazine case 40 comprises, as its main component parts, a lid 43, a magazine frame 44, a shutter plate 45 and a magazine plate 46.

The lid 43 is formed in its central portion with an opening 48 in which a stepped portion 47 is formed. The lid 43 is also formed in its rear end portion with pins 49, 49 and in its front end portion with engaging projections (subclamper) 50, 50. In the opening 48, there is disposed a stabilizer 52. A sponge ring 51 is fixedly secured on the lower surface of the stabilizer 52. The stabilizer 52 is held between the stepped portion 47 and a ring 53 fixedly secured to the lid 43 and is rotatable in the opening 48. The magazine frame 44 is formed in its central portion with a disc locating opening 54, in its rear end portion with engaging recesses 55, 55 and a holding hole 56, in its front end portion with engaging portions 57, 57, in respective corners of its lower surface with location pin holes 58, 58 . . . , on one side thereof with a rack 59 and on the other side thereof with a recessed portion 60. A shutter plate 45 is formed in its central portion with an opening 61 and a slot 62 continuous with the opening 61. A shutter lever 63 is fixedly secured at the rear end portion of the shutter plate 45. The shutter lever 63 has a pin 64 provided at the base portion thereof. The magazine plate is formed in its central portion with a turntable opening 65, in its front end portion with a laser beam slot 66 and in each corner with location pin holes 67, 67. . . A ring 68 is fixedly secured on the upper surface of the peripheral portion of the turntable opening 65.

The lid 43 is attached to the magazine frame 44 with the pins 49, 49 being engaged in the engaging openings 55, 55. The shutter plate 45 is disposed below the magazine frame 44 in such a manner that the pin 64 of the shutter lever 63 is inserted in the holding hole 56 and the tip of the shutter lever 63 is projecting out of the recessed portion 60. By fixing the magazine plate 46 to the lower surface of the magazine frame 44, the shutter plate 45 is held between the magazine plate 46 and the magazine frame 44.

Due to the above described construction, the lid 43 can pivot about the pins 49, 49 so as to open and close the disc locating opening 54 in which the disc 42 is received. When the lid 43 is closed, the engaging projections 50, 50 engage with the engaging portions 57, 57 so that unexpected opening of the lid 43 is prevented. The shutter plate 45 is rotatable about the pin 64 in the direction of arrows P5, P6 by operating the tip portion of the shutter lever 63 and the laser beam slot 66 can be opened and closed by bringing the slot 62 in and out of register with the laser beam slot 66. The location pin holes 58 formed in the respective corners of the magazine frame 44 are in register with their corresponding location pin holes 67 formed in the respective corners of the magazine plate 46. These location pin holes constitute a location pin insertion portion 69 (i.e., a positioning portion).

Figure 1:
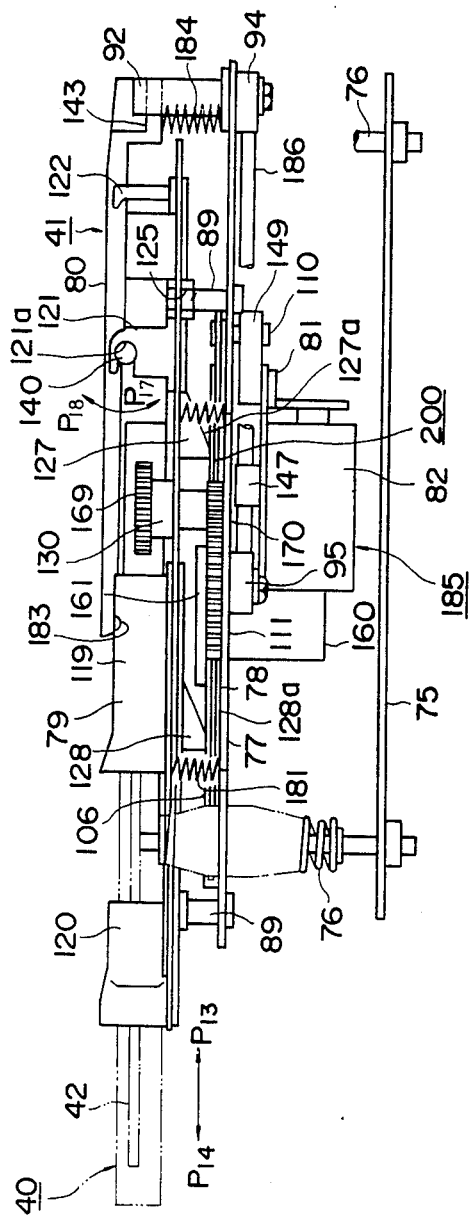
Figure 2:
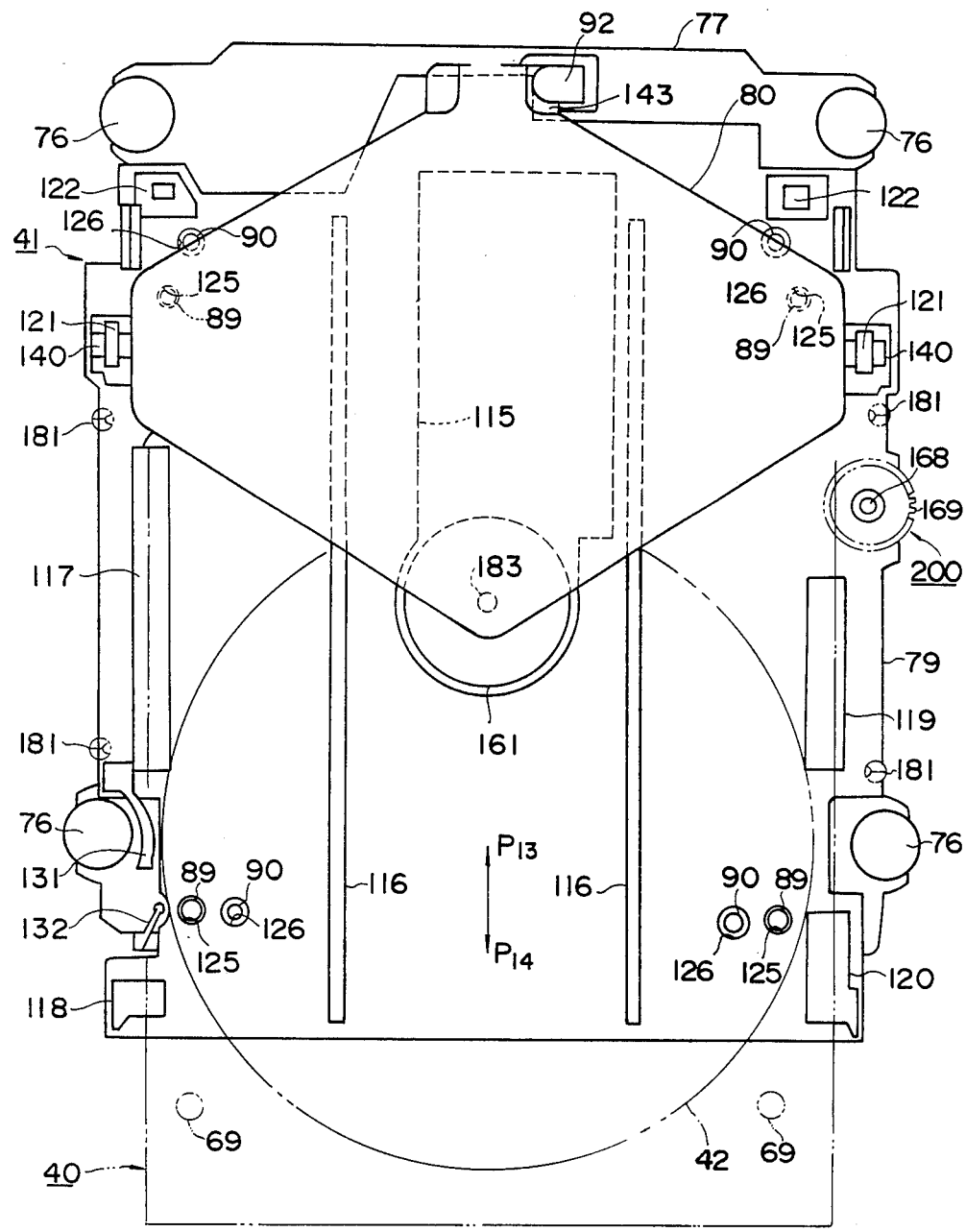
Figure 3:
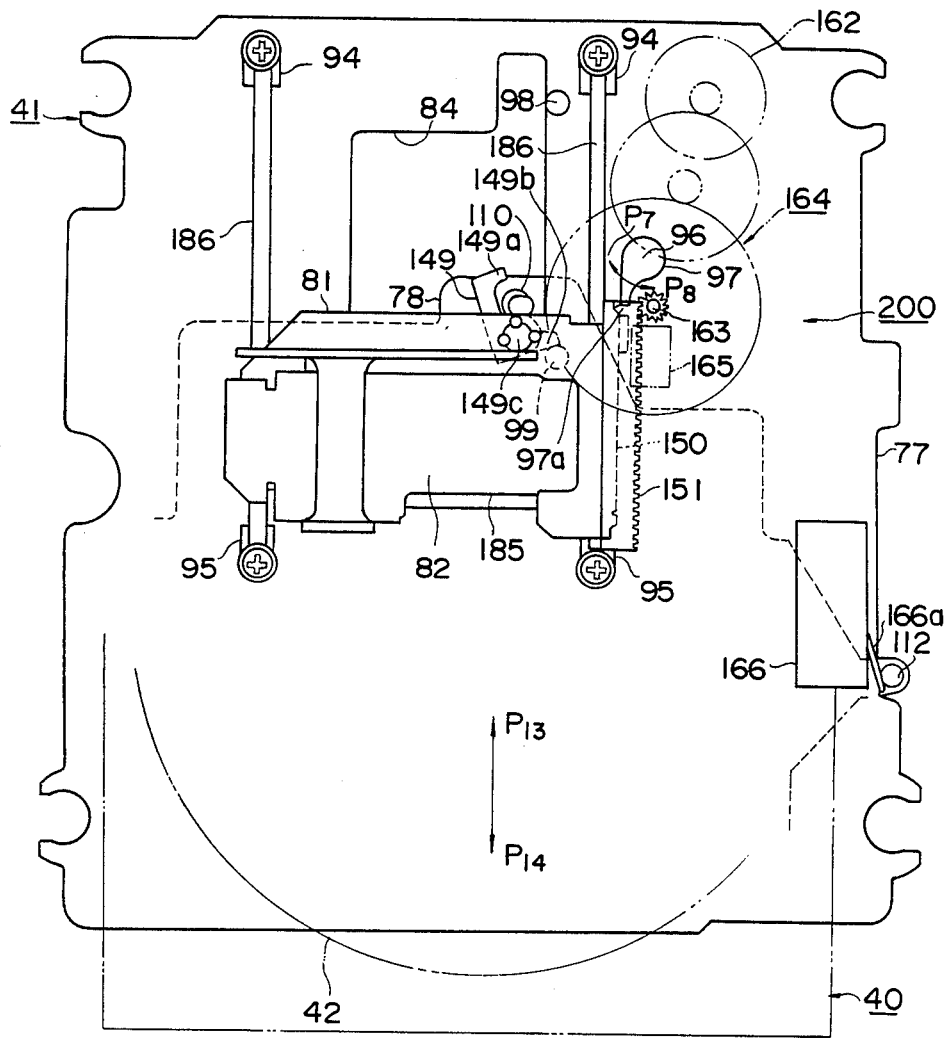

The construction of a main body 41 of the device will now be described with reference to FIGS. 1 through 3. In FIG. 1, reference numeral 75 designates a bottom plate of an outer case. A chassis 77 is mounted on the bottom plate 75 by means of suspension mechanisms 76, 76 . . . As shown in FIGS. 1 through 4, a carrier 78, a holder 79 and a clamper 80 are provided on the chassis 77 and a head base 81 and an optical pickup head 82 are provided under the chassis 77.

The chassis 77 is of an oblong plate-like configuration as shown in FIGS. 5 through 10. The chassis 77 is made by pressing a metal plate into a predetermined shape and thereafter forming projections of synthetic resin and openings by outserting forming process. The carrier 78 and holder 79 are formed in the same manner. The chassis 77 is formed in its rear portion with an opening 84, in its left and right portions with cam receiving slots 85, 85, 86, 86 and connection spring holes 87, 87 . . . , on its left and right upper surfaces with rails 88 and 88 extending in the longitudinal direction of the chassis 77, in each corner of its upper surface with location pins 89, 89 . . . and lowermost position restricting pins 90, 90 . . . , in its central portion with a disc driving motor securing portion 91, in its rear portion with an upwardly projecting clamper stop 92 and a feed loading motor securing portion 93, on its lower surface on both sides of the opening 84 with guide bar securing portions 94, 94, 95, 95 and on its lower surface on one side of the opening 84 with an actuator 97 rotatable in the direction indicated by arrows P7 and P8 about on axis 96 and engaging pins 98 and 99.

Details of the carrier 78 are shown in FIGS. 11 through 14. The carrier 78 is formed in its central portion with an opening 105, on its upper surface on both sides of the opening 105 with cam engaging plates 106, 106, adjacent to the central portions of the cam engaging plates 106, 106 with cam engaging slots 107, 107, in its lower surface portion on both sides of the opening 105 with projections 109, 109 to form grooves 108, 108 extending in the moving direction of the disc magazine case 40, in the rear end portion of its lower surface with a carrier pin 110, in the rear portion of its one side portion with a carrier rack 111 and on the lower surface of the other side with an engaging pin 112.

Details of the holder 79 are shown in FIGS. 15 through 22. The holder 79 is made of an oblong plate formed with projections and openings. The holder 79 is formed in its rear portion with an opening 115, on its upper surface on both sides of the opening 115 with rails 116, 116 extending in the moving direction of the disc magazine case 40, on the upper surface of its left and right portions with guide walls 117-120, on the upper surface of its rear end portion with clamper support walls 121, 121 having openings 121a, 121a, case stops 122, 122 and a pin 123, on its both side portions with connection spring holes 124, 124 . . . , in each corner thereof with location pin guide holes 125, 125 . . . and lowermost position restricting pin holes 126, 126 . . . , on the lower surface of its left and right portions with cams 127, 127, 128, 128 i.e., projections respectively having a tapered lower surface and on one side portion thereof with a pinion securing portion 130 having an opening 129. On one side of the front end portion of the holder 79 are provided an opening hook 131 (opening member), a closing hook 132 (closing member), pins 133 and 134. The opening hook 131 consists of a fixing portion 131a secured fixedly to a plate portion 135 and an engaging portion 131b extending forwardly from the fixing portion 131a. The engaging portion 131b can elastically deform in the direction of arrows P9, P10. The closing hook 132 consists of a curved portion 132a disposed on the lower surface of the plate portion 135 and fixed in one end portion thereof to the plate portion 135, a linear portion 132b extending laterally along the lower surface of the plate portion 135 from the other end of the curved portion 132a with its tip portion projecting outwardly from the side edge of the plate portion 135, and an engaging portion 132c extending obliquely rearwardly from the tip of the linear portion 132b towards the plate portion 135 and being located above the plate portion 135 with the opening hook 131. The closing hook 132 can move in the direction of arrows P9, P10 by elastic deformation of the curved portion 132a caused by engagement of the engaging portion 132c with the curved portion 132a. The linear portion 132b constantly moves along a predetermined course being guided by the pin 133 when it is moved with the engaging portion 132c in the direction of the arrows P9, P10. The engaging portion 132c is previously pulled slightly in the direction of the arrow P9 to be defected so that a projection formed in the linear portion 132b is engaged with a pin 134 provided on the plate portion 135.

The cams 127, 127, 128, 128 are formed on the lower surface thereof with cam surfaces 127a, 127a, 128a, 128a inclining forwardly downwardly.

The clamper 80 is generally of a diamond shape as shown in FIGS. 23 through 27 and is formed on both sides thereof with pins 140, 140, in its foremost end portion with a recess 141, on its rear lower surface with a pin 142 and on the left and right sides of the pin 142 with engaging walls 143.

Figure 28:
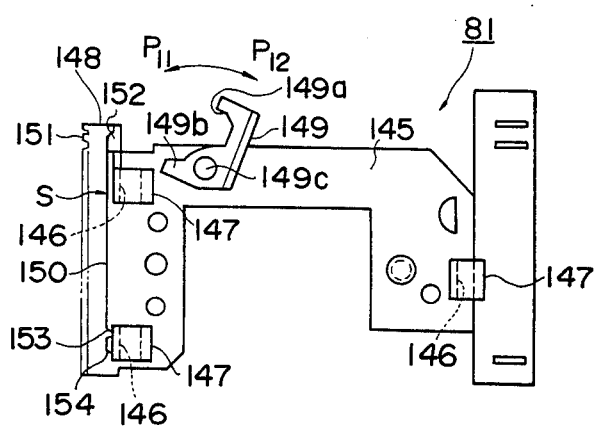
Figure 29:
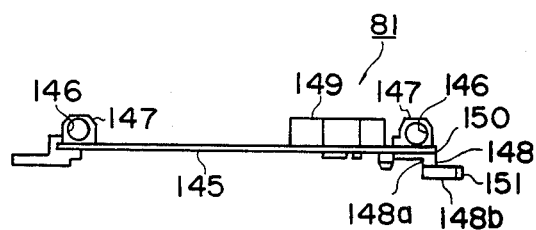
Figure 30:
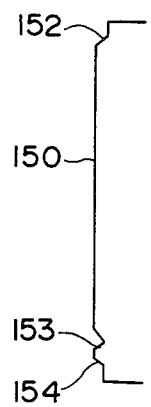

The head base 81 is shown in detail in FIGS. 28, 29 and 30. As shown in these figures, a plate portion 145 of the head base 81 is formed in its both side portions with guide portions 147, 147, 147 having guide holes 146, 146, 146 and in its one side portion with a wall portion 148 extending in the moving direction of the disc magazine case 40. An engaging hook 149 is pivotably mounted on the upper surface of one side portion of the head base 81. The wall portion 148 consists of a downwardly projecting vertical portion 148a and a horizontal portion 148b projecting laterally outwardly from the lower end of the vertical portion 148a. On the outside surface of the vertical portion 148a is formed a cam 150 and on the outside surface of the horizontal portion 148b is formed a feed loading rack 151. The cam 150 has, as shown in FIGS. 29 and 30, read-in position detection recess 152, a read-out position detection recess 153 and an overstroke position detection recess 154 on a flat wall surface. The engaging hook 149 has a hook portion 149a, an engaging portion 149b and a pin 149c. The pin 149c is mounted on the plate portion 145 rotatably in the direction of arrows P11 and P12.

As shown in FIGS. 1 through 4, to the disc driving motor securing portion 91 under the chassis 77 is secured a disc driving motor 160 and to the rotation shaft of the disc driving motor 160 projecting above the chassis 77 is secured a turntable 161. To the feed loading motor securing portion 93 is secured a feed loading motor 162. Further, as shown in FIG. 3, to the lower surface of the chassis 77 are secured a feed loading pinion 163, gear train 164 transmitting a rotational force of the motor 162 to the pinion 163, a head position detection switch 165 whose circuit is switched when the actuator 97 is operated and a disc magazine case detection switch 166. An operation lever (not shown) of the head position detection switch 165 constantly urges the engaging portion 97a of the actuator 97 in the direction of the arrow P7.

The carrier 78 is mounted on the chassis 77 with the rails 88, 88 of the chassis 77 being engaged in the grooves 108, 108 formed in the lower surface portion of the carrier 78. In this state, the carrier pin 110 is projecting downwardly of the chassis 77 through the opening 84. The engaging pin 112 is projecting downwardly of the chassis 77 from the side portion of the chassis 77 so as to abut against an actuator 166a of the disc magazine case detection switch 166. The turntable 161 is projecting upwardly from the carrier 78 through the opening 105. The carrier 78 is displaceable in the direction of arrows P13 and P14 being guided along the rails 88, 88 in the state in which the carrier 78 is mounted on the chassis 77 in the above described manner.

The pin 168 is rotatably inserted in the opening 129 of the pinion securing portion 130 of the holder 79. To the upper end portion of the pin 168 projecting above the pinion securing portion 130 is secured a loading pinion 169 and to the lower end portion of the pinion securing portion 130 of the pin 168 is secured a carrier pinion 170.

Figure 31:
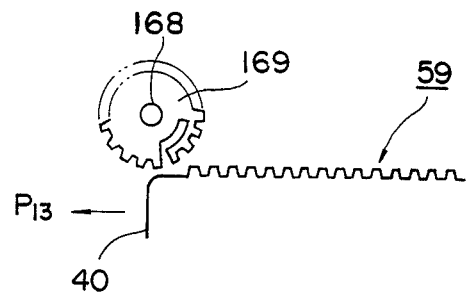
Figure 32:
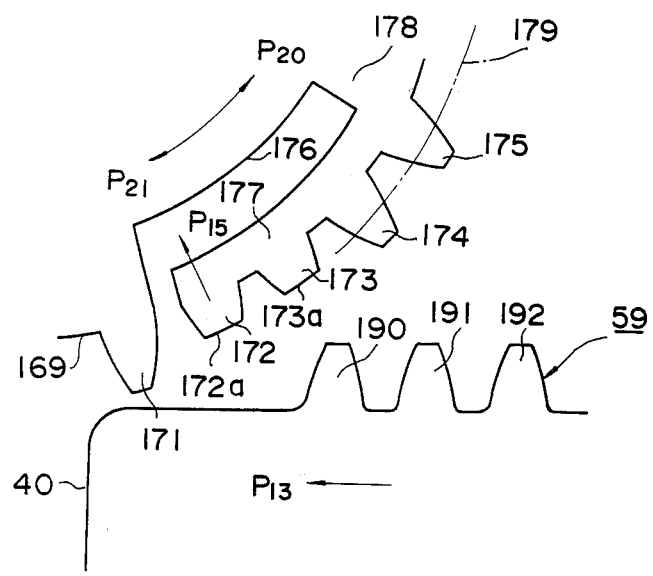
Figure 33A:
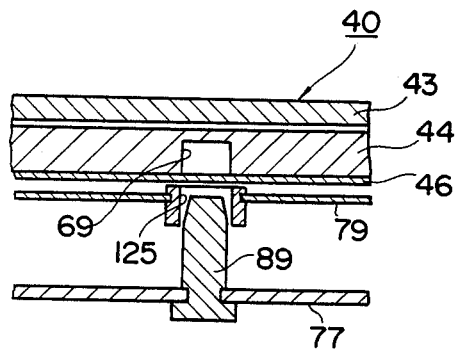
FIGS. 33a and 33b are views showing relative positions of the chassis, holder and the essential portion of the disc magazine case.
Figure 33B:
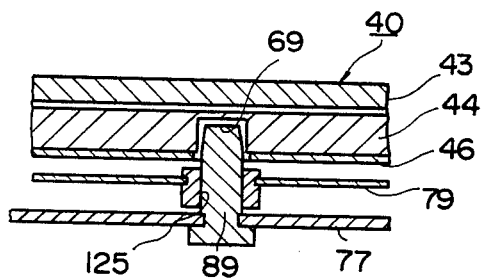

The loading pinion 169 is adapted to mesh with the rack 59 of the disc magazine case 40 when the disc magazine case 40 is inserted in the holder 79 as will be described later. An initial meshing position between teeth of the pinion 169 and teeth of the rack 59 may differ depending upon the standby position of the pinion 169. This loading pinion 169 is so constructed that a predetermined teeth thereof meshes with a first teeth of the rack 59 despite the difference in the initial meshing position so that the initial meshing between the pinion 169 and the rack 59 is effected smoothly. More specifically, as shown in FIGS. 31 and 32, the loading pinion 169 has recess 176 formed in the portion of teeth 171–175 in such a manner that the tooth 171 is separated from the tooth 172 and the recess 176 extends in the peripheral direction of the pinion 169 at the rear of the teeth 172–175, with a wall portion 177 formed with the teeth 172–175 being supported by a main wall portion 178 in the form of a cantilever. The teeth 172 and 173 are lower in their height than the other teeth including the teeth 171, 174 and 175, with tooth edges 172a and 173a being substantially aligned with a pitch circle 179 of the other teeth. This construction enables the wall portion 177 to flex in the direction of arrow P15.

In the state in which the location pins 89, 89 ... of the chassis 77 are inserted in the location pin guide holes 125, 125 ... (FIGS. 33a, 33b) and the carrier 78 is disposed between the chassis 77 and the holder 79, the holder 79 on which the loading pinion 169 and the carrier pinion 170 are mounted is supported vertically movably on the chassis 77. The lower ends of the cams 127, 127, 128, 128 are in abutting engagement with the upper surfaces of the cam engaging plates 106, 106 in the non-playback mode. The carrier pinion 170 is in mesh with the carrier rack 111 of the carrier 78. The lowermost position restricting pins 90, 90 ... are disposed beneath the lowermost position restricting pin holes 126, 126... Connection springs 181, 181 ... are provided between the connection spring holes 124, 124 ... of the holder 79 and the connection spring holes 87, 87 ... of the chassis 77. In this construction, the holder 79 is constantly urged downwardly to the chassis 77.

A steel ball 183 is fittedly received in the recess 141 formed in the foremost end portion of the clamper 80. The clamper 80 is attached to the holder 79 with the pins 140, 140 being engaged in the openings 121a, 121a of the clamper support walls 121, 121. The clamper 80 is rotatable about the pins 140, 140 in the direction of arrows P17 and P18 but its scope of rotation is limited to a position in which the engaging wall 143 abuts against the clamper stop 92 of the chassis 77. A spring 184 is provided between the pin 142 of the clamper 80 and the pin 123 of the holder 79 so that the clamper 80 is constantly urged in the direction of the arrow P17.

Figure 4:
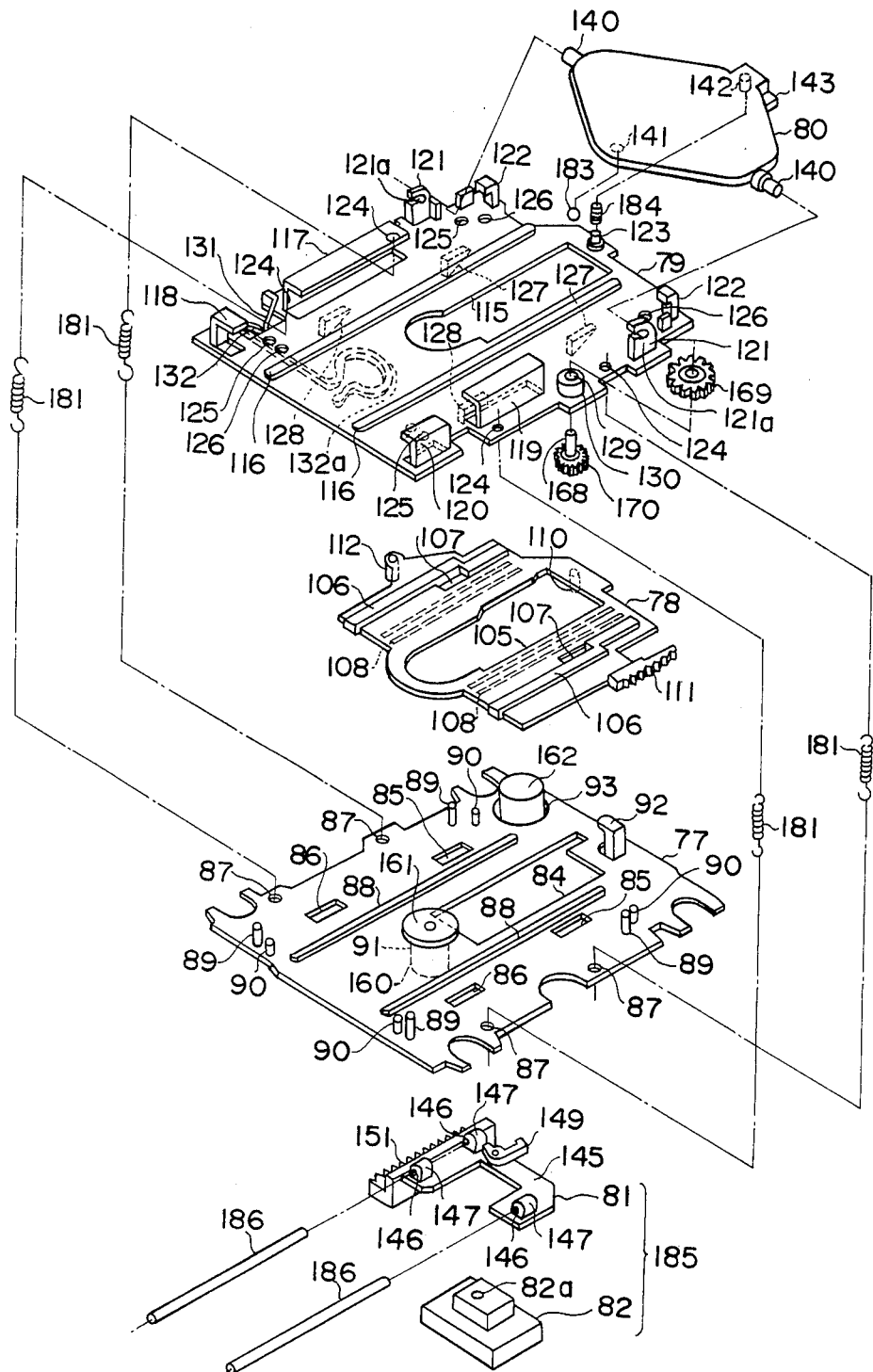
Figure 5:
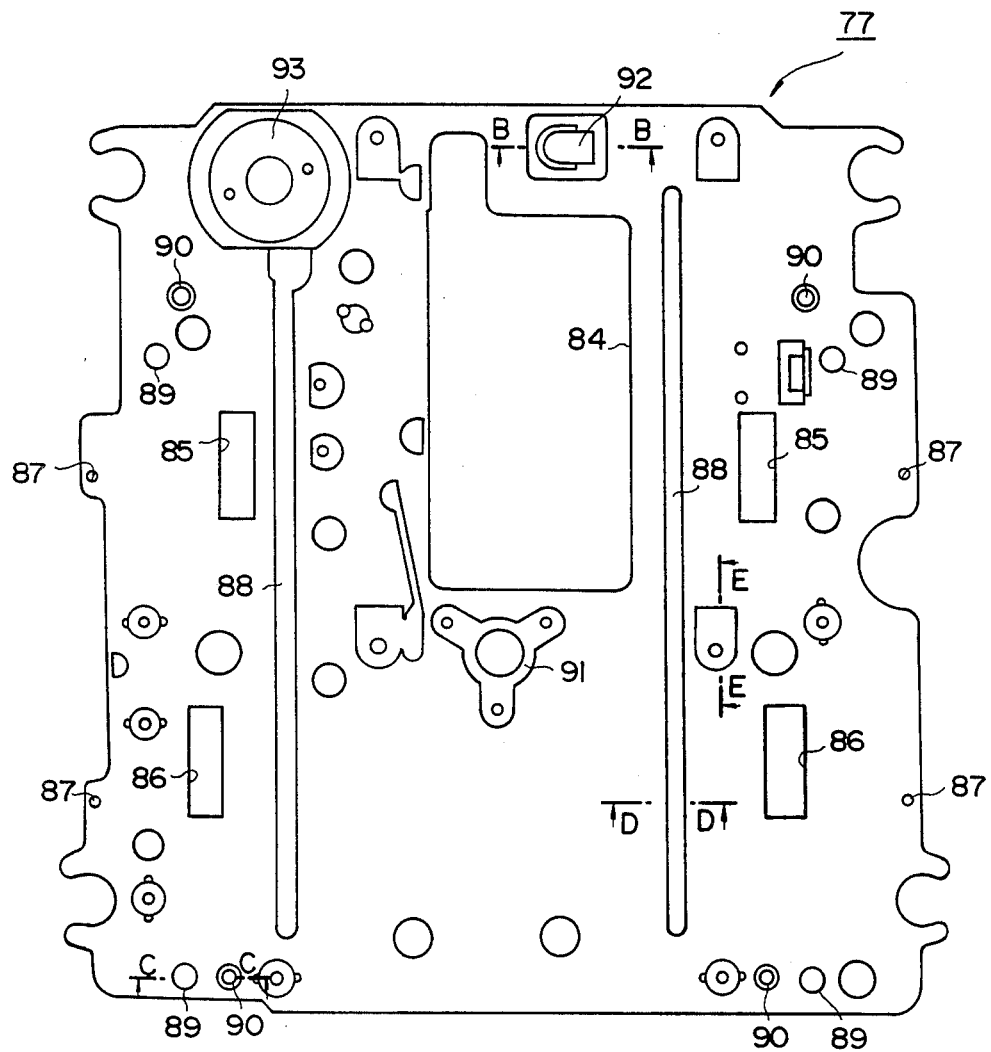
Figure 6:
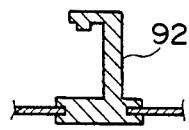
Figure 7:
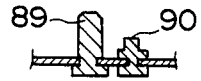
Figure 8:
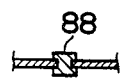
Figure 9:
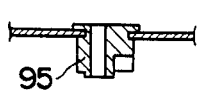
Figure 10:
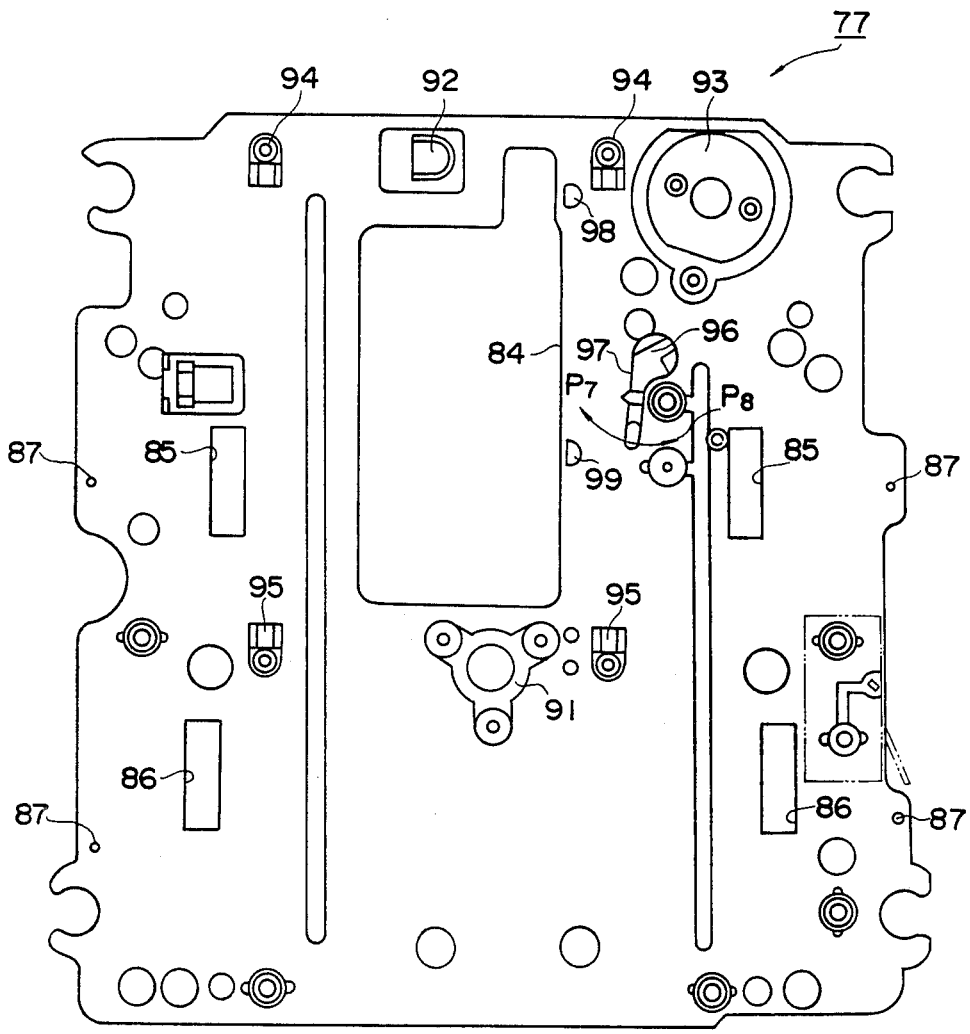
Figure 11:
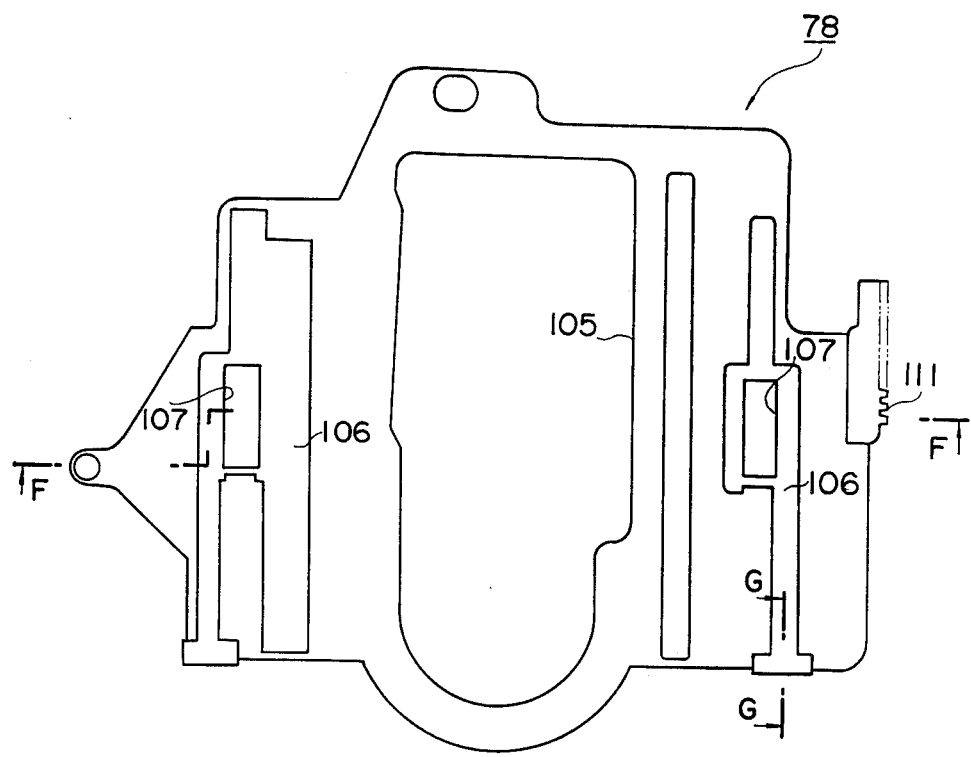
Figure 12:
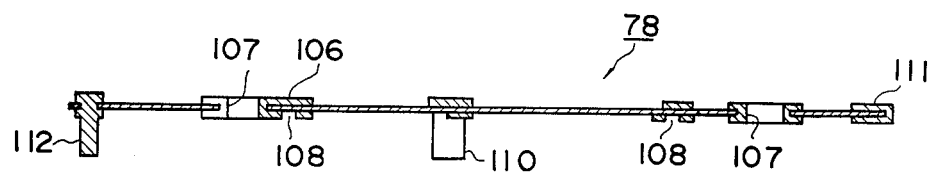
Figure 13:
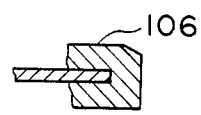
Figure 14:
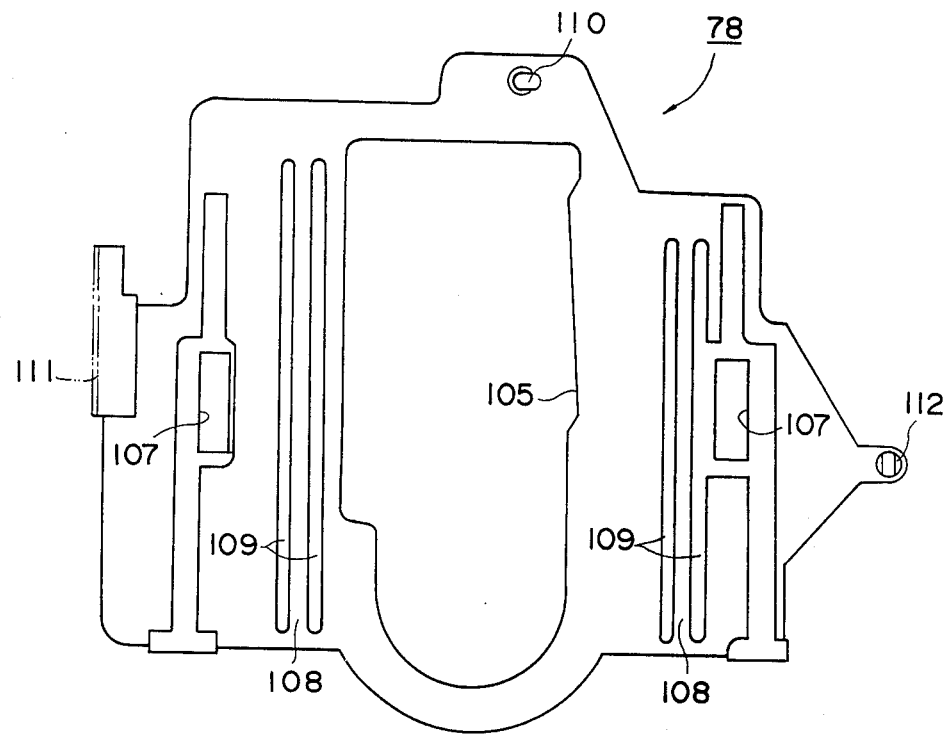
Figure 15:
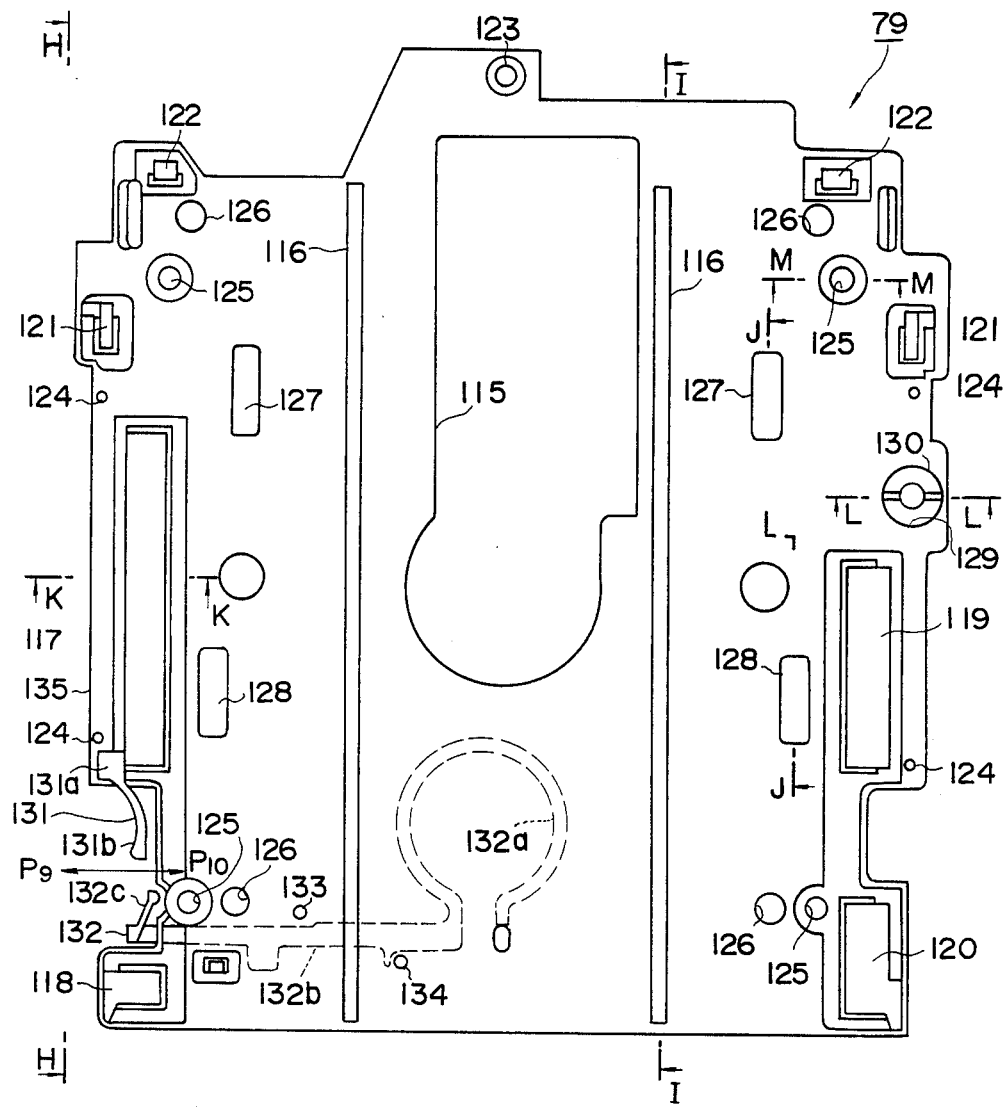
Figure 16:
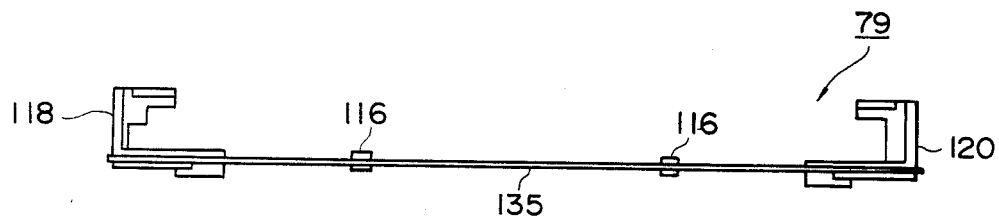
Figure 17:
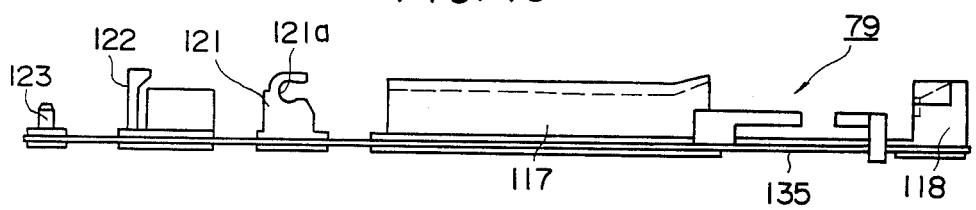
Figure 18:
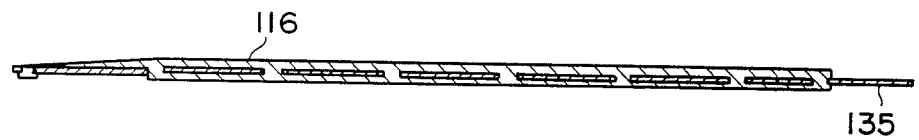
Figure 19:
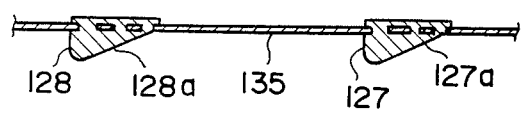
Figure 20:
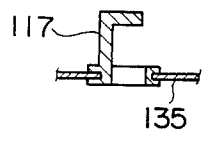
Figure 21:
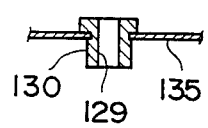
Figure 22:
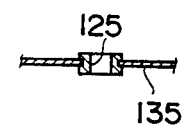
Figure 23:
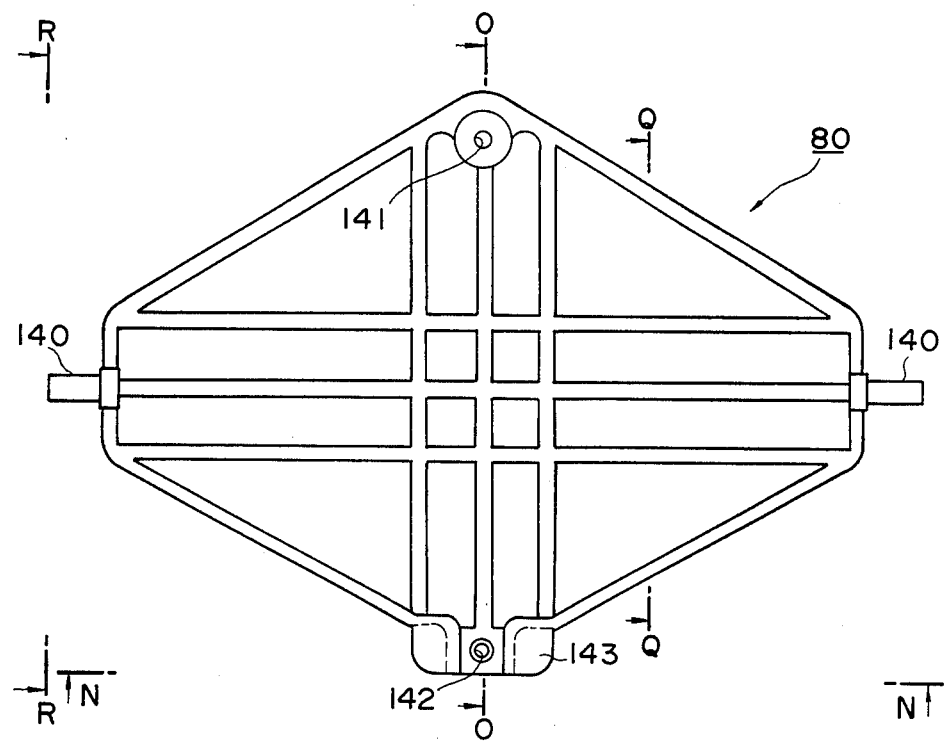
Figure 24:
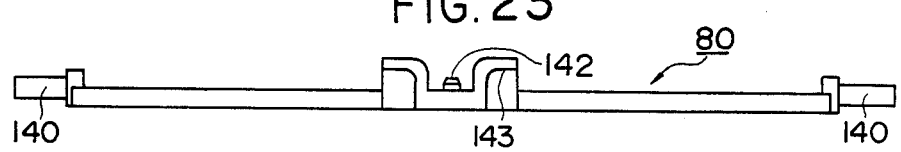
Figure 25:
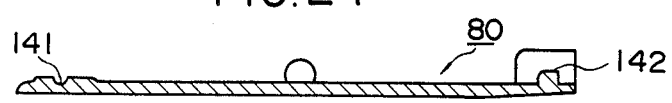
Figure 26:
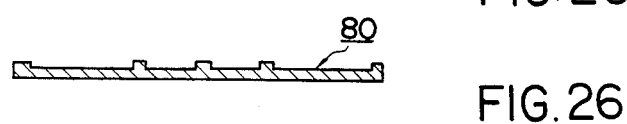
Figure 27:
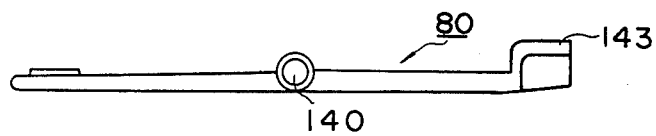

On the head base 81 is mounted the optical pickup head 82 with its signal reading portion 82a (FIG. 4) facing upward. The head base 81 and the pickup head 82 constitute a head device 185. This head device 185 is mounted on the lower surface of the chassis 77 as shown in FIGS. 1, 3 and 4. More specifically, guide bars 186, 186 are supported between the guide bar securing portions 94, 94 and 95, 95 formed on the lower surface of the chassis 77. The head base 81 is mounted on the guide bars 186, 186 with the guide bars 186, 186 being engaged in the guide openings 146, 146 of the guide portions 147, 147. In this state, the head device 185 is displaceable in the direction of arrows P13 and P14 being guided along the guide bars 186, 186. The feed loading rack 151 of the head base 81 is in meshing engagement with the feed loading pinion 163. The engaging portion 97a of the actuator 97 is in abutting engagement with the cam 150 of the head base 81. The engaging portion 149b of the engaging hook 149 is located between the engaging pins 98 and 99 formed on the chassis 77. The rear edge of the head base 81 can abut against the carrier pin 110 of the carrier 78 and the hook portion 149a of the engaging hook 149 can engage with the carrier pin 110.

In the above described construction, the feed loading motor 162, gear train 164, head device 185, carrier 78, carrier pinion 170 and loading pinion 169 constitute a loading device 200 for carrying out loading and ejecting of the disc magazine case 40 as will be described later.

Operations of the above described embodiment of the disc playback device will now be described with reference to FIGS. 1 through 3 and 31 through 41.

Figure 39A:
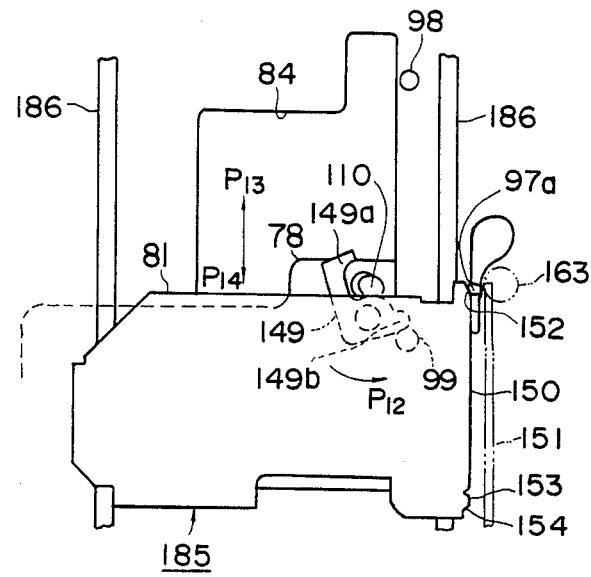

In a state before the disc magazine case 40 is inserted, the main body 41 of the device is in a state shown in FIG. 37a, i.e., the carrier 78 is in a position displaced in the direction of the arrow P14 and the holder 79 and the clamper 80 are in an elevated state with the lower ends of the cams 127, 127, 128, 128 being in abutting engagement with the upper surfaces of the cam engaging plates 106, 106 of the carrier 78. The head device 185 is in a position in which it is displaced in the direction of the arrow P14 as shown in FIG. 39a with the engaging portion 149b of the engaging hook 149 abutting against the engaging pin 99 and the hook portion 149a of the engaging hook 149 being disengaged from the carrier pin 110 of the carrier 78. The engaging portion 97a of the actuator 97 is engaged in the read-in position detection recess 152 of the cam 150. The engaging pin 112 of the carrier 78 is in abutting engagement with the actuator 166a of the disc magazine case detection switch 166 as shown in FIG. 3. The carrier pinion 170 is meshed with the carrier rack 111.

For performing playback of the disc 42, the disc 42 is placed in the disc locating opening 54 of the disc magazine case 40, the disc magazine case 40 is closed and then the disc magazine case 40 is inserted manually into the holder 79 from the front end of the main body 41. At this time, the laser beam slot 66 of the disc magazine case 40 is closed by through the shutter plate 45. The disc magazine case 40 thereupon is moved in the direction of the arrow P13 being guided along the guide walls 117–120 and the rails 116, 116, and the rack 59 of the case 40 comes into meshing engagement with the loading pinion 169 when the disc magazine case 40 has been inserted into the holder 79 by a predetermined distance. The meshing engagement between the rack 59 and the loading pinion 169 is effected in the following manner.

When the main body 41 is in a standby state, the teeth 171-175 of the loading pinion 169 are ready for meshing with the rack 59 as shown in FIGS. 31 and 32, with the tooth 171 being located in such a position as to engage initially with the leading tooth 190. If the loading pinion 169 is in a normal position when the disc magazine case 40 has been inserted in the direction of the arrow P13, the tooth 190 of the rack 59 abuts against the tooth 171 of the loading pinion 169 (since the teeth 172 and 173 are short, the tooth 190 initially abuts against the tooth 171). After the initial meshing between the teeth 190 and 171, the teeth 172, 173 . . . mesh with the teeth 191, 192 . . . sequentially and initial meshing between these teeth is smoothly effected. If, for example, the loading pinion 169 has been displaced from a normal position in the direction of the arrow P20 due to vibration applied to the main body 41 of the device, the tooth 172 is spaced away from the tooth 190 but the tooth 171 abuts against the tooth 190 in the same manner as in the normal case and subsequent teeth mesh smoothly thereafter. In a case where the loading pinion 169 is offset slightly in the direction of the arrow P21, the tooth 190 of the rack 59 initially abuts against the tip surface of the tooth 172 of the loading pinion 169. Thereupon the tooth 172 is withdrawn in the direction of the arrow P15 by flexing in the same direction of the wall portion 177 on which the tooth 172 is formed. The tooth 190 therefore advances in the direction of the arrow P13 pushing the tooth 172 in the direction of the arrow P15. Therefore, in this case also, the tooth 190 initially meshes with the tooth 171. In the foregoing manner, in the initial meshing between the rack 59 and the loading pinion 169, the leading tooth 190 of the rack 59 is always ready to mesh with the tooth 171 of the loading pinion 169.

The operator of the disc magazine case 40 releases the disc magazine case 40 when the loading pinion 169 has been rotated slightly upon its meshing with the rack 59. As the loading pinion 169 is rotated, this rotation is transmitted to the carrier pinion 170 through the pin 168 so that the carrier rack 111 which is in mesh with carrier pinion 170 is moved in the direction of the arrow P13 and the carrier 78 is thereby moved slightly in the same direction. Thereupon the engaging pin 112 is disengaged from the actuator 166a of the disc magazine case detection switch 166 shown in FIG. 3 thereby turning the switch 166 on.

Figure 39B:
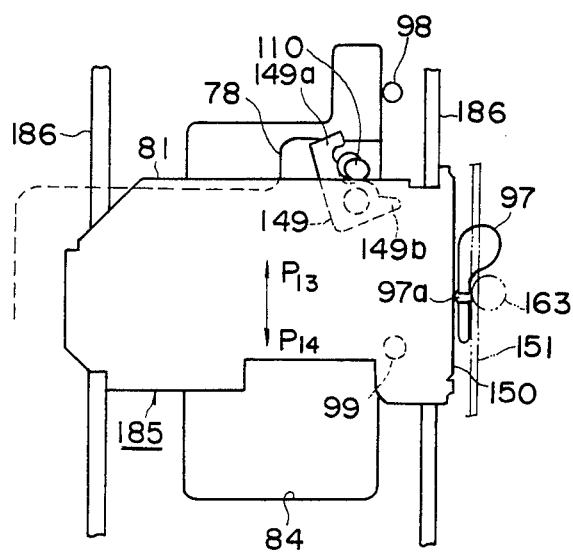

Upon turning on of the switch 166, the feed loading motor 162 is turned on by operation of a control circuit (not shown) and the rotation of this motor 162 is transmitted to the feed loading pinion 163 through the gear train 164. The feed loading rack 151 which is in mesh with the pinion 163 is moved in the direction of the arrow P13 and the head device 185 is thereby moved in the same direction. The movement of the head device 185 in this direction causes the rear edge of the head base 81 to abut against the carrier pin 110 and push the carrier pin 110 in the direction of the arrow P13 as shown in FIG. 39b thereby moving the carrier 78 in the same direction. At this time, the engaging portion 97a of the actuator 97 is in sliding engagement with the flat surface of the cam 150. The cams 127, 127, 128, 128 of the holder 79 slide over the cam engaging plates 106, 106 of the carrier 78. As the carrier 78 moves in the direction of the arrow P13, the carrier pinion 170 which is meshed with the carrier rack 111 is rotated which in turn causes the loading pinion 169 to rotate. The disc magazine case 40 whose rack 59 is meshed with this loading pinion 169 is moved in the direction of the arrow P13 towards the inside of the holder 79 as shown in FIG. 37b. During this movement, the laser beam slot 66 is opened by rotation of the shutter plate 45. This operation will be described more fully later. Upon reaching of the disc magazine case 40, carrier 78 and the head device 185 to a predetermined position in the direction of the arrow P13, the cam surfaces 127a, 127a of the holder 79 gradually enter the cam engaging slots 107, 107 of the carrier 78 and the cam receiving slots 85, 85 of the chassis 77 whereas the cam surfaces 128a, 128a gradually enter the cam receiving slots 86, 86 of the chassis 77, moving downwardly from the front edge of the cam engaging plates 106, 106. In this manner, the holder 79 and the clamper 80 supported on the holder 79 are gradually lowered to the lowermost position shown in FIG. 37c whereupon the loading operation of the disc magazine case 40 is completed.

In this operation, the location pin holes 69 formed in the disc magazine case 40 are located above the location pins 89, 89 . . . formed on the chassis 77 when the disc magazine case 40 has reached a predetermined position. As the holder 79 is lowered, the location pins 89, 89 . . . enter the location pin holes 69, 69 . . . guiding the downward movement of the disc magazine case 40 smoothly to its lowermost position. Also, the downward movement of the holder 79 causes the lowermost position restricting pins 90, 90 . . . formed on the chassis 77 to enter the lowermost position restricting pin holes 126, 126 . . . and project above the upper surface of the holder 79 and abut against the lower surface of the disc magazine case 40 thereby defining the lowermost position of the disc magazine case 40. The position in the horizontal direction at which the disc magazine case 40 starts its downward movement is determined by the constructions of the cams 127, 127 of the holder 79, the cam receiving slots 85, 85 and of the chassis 77 and the front edges of the cam engaging plates 106, 106 of the carrier 78. For preventing excessive rearward movement of the disc magazine case 40 in the direction of the arrow P13 for any unexpected reason, case stops 122, 122 are formed on the holder 79. These case stops 122, 122 are formed in such a manner that they are normally opposed to the innermost edge of the disc magazine case 40 with a small distance therebetween.

As the holder 79 is lowered, the turntable 161 located on the upper surface of the chassis 77 projects above the holder 79 through the opening 105 of the carrier 78 and the opening 115 of the holder 79 and enters the turntable opening 65 of the disc magazine case 40 and abuts against the lower surface of the disc 42. In the meanwhile, as the clamper 80 is lowered with the holder 79, the steel ball 183 attached on the front end portion of the clamper 80 abuts against the stabilizer 52 of the disc magazine case 40. The steel ball 183 pushes the stabilizer 52 downwardly by the force of the spring 184 so that the stabilizer 52 abuts against the upper surface of the disc 42. Accordingly, the disc 42 is held between the turntable 161 and the stabilizer 152 thereby being maintained in a playable state.

When the holder 79 has reached its lowermost position shown in FIG. 37c, the carrier pinion 170 secured on the holder 79 is disengaged from the carrier rack 111 and is located below the carrier rack 111.

Figure 39C:
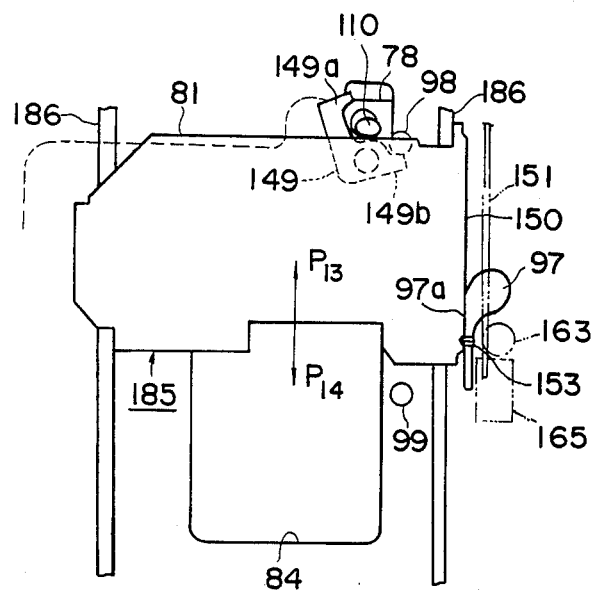
Figure 39D:
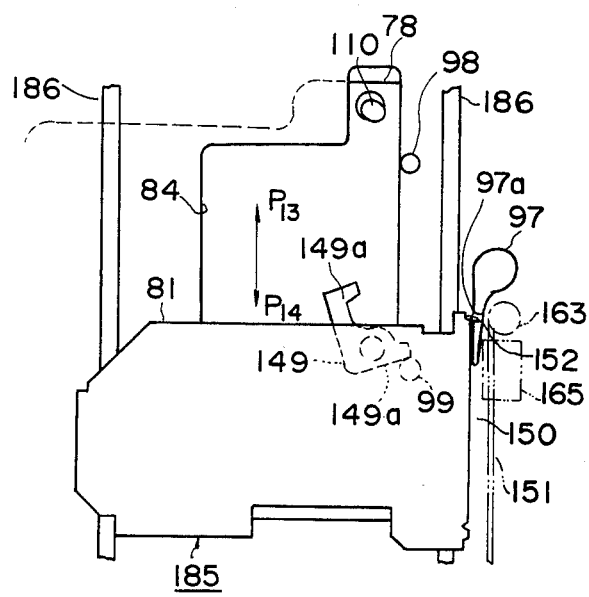

In the above described operation, when the holder 79 has reached its lowermost position, the engaging portion 97a of the actuator 97 engages in the read-out position detection recess 153 of the cam 150 as shown in FIG. 39c. The circuit of the head position detection switch 165 thereupon is switched to reversely rotate the feed loading motor 162 by operation of a control circuit (not shown). The head device 185 thereupon is moved in the direction of the arrow P14. Since at this time the hook portion 149a of the hook 149 is disengaged from the carrier pin 110, the carrier 78 is left in the position shown in FIG. 39c. As the head device 185 is moved in the direction of the arrow P14 and the engaging portion 97a of the actuator 97 engages in the read-in position detection recess 152 of the cam 150, the head position detection switch 165 is switched to turn off the feed loading motor 162. The pickup head 82 therefore is placed in the read-in position. When the head device 185 moves in the state in which the disc magazine case 40 is held playably in the main body 41, the signal reading portion 82a of the pickup head 82 moves beneath the laser beam slot 66 of the disc magazine case 40.

In the above described state in which the head position detection switch 165 has detected the read-in position, a playback command is issued by a control circuit (not shown). The disc driving motor 160 thereby is switched on to rotate the turntable 161 and therefore the disc 42. The signal reading portion 82a of the optical head 82 reads signals recorded on the disc 42 through the laser beam slot 66 so that the disc 42 is played. The feed loading motor 162 is turned on each time the tracking servo by a system including a tracking mirror has reached its limit moving the pickup head 82 by a predetermined distance in the direction of the arrow P13.

Figure 39E:
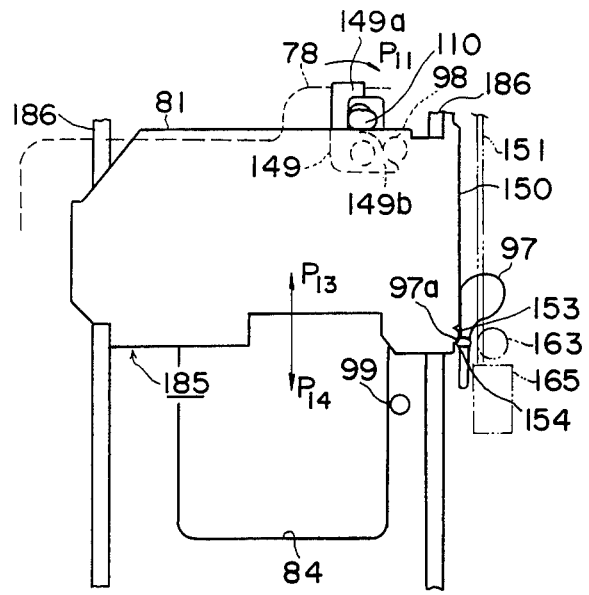
Figure 39F:
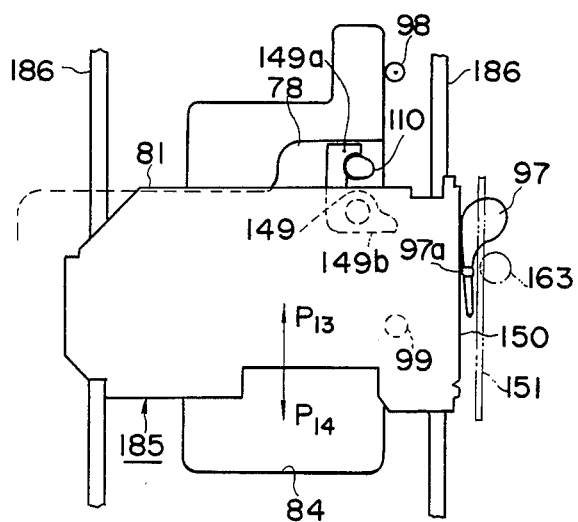

Upon reaching of the pickup head 82 to a last track position of the disc 42, the playback of the disc 42 is completed and the engaging portion 97a of the actuator 97 engages in the read-out position detection recess 153 of the cam 150 to switch the head position detection switch 165. A control circuit (not shown) thereupon issues an eject command to rotate the feed loading motor 162 and thereby move the head device 185 in the direction of the arrow P13 as shown in FIG. 39e, causing the optical head 82 to travel overstroke beyond the read-out position. As the head device 185 moves in this manner, the engaging portion 149b of the engaging hook 149 abuts against the engaging pin 98 and is pushed by this engaging pin 98. This in turn causes the engaging hook 149 to rotate in the direction of the arrow P11 to have its hook portion 149a engaged with the carrier pin 110. At this time the engaging portion 97a of the actuator 97 engages in the overstroke detection recess 154 of the cam 150 to switch the head position detection switch 165. As the switch 165 is switched, the feed loading motor 162 is reversely rotated so that the head device 185 starts movement in the direction of the arrow P14. During this movement, the hook portion 149a of the engaging hook 149 is engaged with the carrier pin 110 as shown in FIG. 39e so that the carrier 78 is moved with the head device 185 in the direction of the arrow P14. This causes the holder 79 and the clamper 80 to be lifted and the disc magazine case 40 to be moved in the direction of the arrow P14 in an operation reverse to the previously described loading operation of the disc magazine case 40 (FIG. 39f). Upon returning of the head device 185 to the original position shown in FIG. 39a, the engaging portion 149b of the engaging hook 149 abuts against the engaging pin 99 and is pushed by this engaging pin 99 so that the engaging hook 149 is rotated in the direction of the arrow P12 to disengage the hook portion 149a from the carrier pin 110. Also, the engaging portion 97a of the actuator 97 engages in the read-in position detection recess 152 to switch the head position detection switch 165 and thereby turn off the feed loading motor 165. Since the end portion of the disc magazine case 40 now projects out of the holder 79, the disc magazine case 40 can be taken out by holding the end portion thereof.

In the loading, playing and ejecting operations of the disc 42, the laser beam slot 66 of the disc magazine case 40 is opened and closed in the following manner.

Figures 40A, 40B:
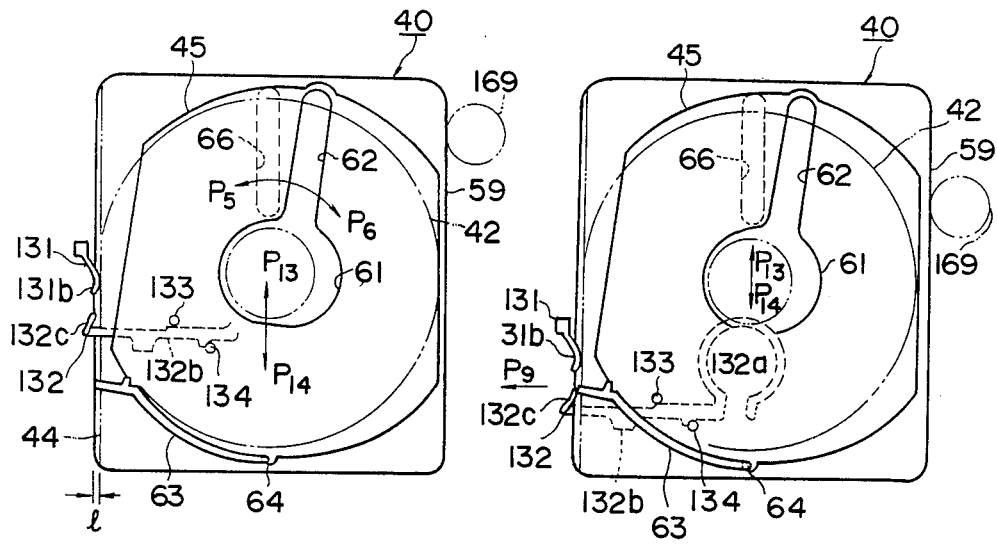
Figures 40C, 40D:
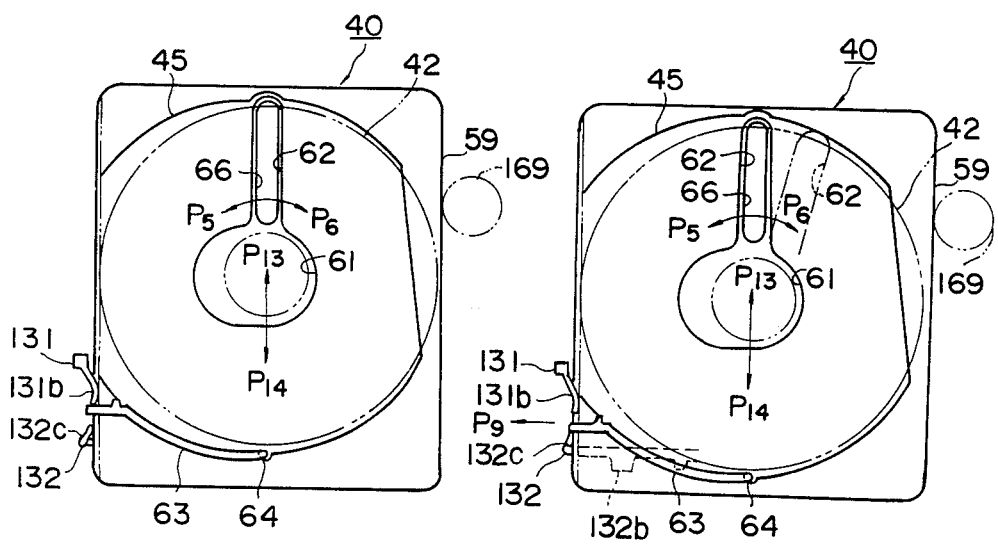

In the initial stage of the loading operation in which the disc magazine case 40 has been inserted in the holder 79, the laser beam slot 66 is closed by the shutter plate 45 as shown in FIG. 40a, since the shutter plate 45 is in a state in which it has rotated about the pin 64 in the direction of the arrow P6. As the disc magazine case 40 has moved in the direction of the arrow P13 by a predetermined distance, the tip portion of the shutter lever 63 rides over the engaging portion 132c of the closing hook 132 as shown in FIG. 40b. At this time the engaging portion 132c and the linear portion 132b of the closing hook 132 are displaceable in the direction of the arrow P9 due to the elastic deformation of the curved portion 132a and permits passing of the shutter lever 63 while the engaging portion 132c is in abutting engagement with the shutter lever 63. After passing of the shutter lever 63, the closing hook 132 returns to the original position by elastic restoration of the curved portion 132a. In this movement, the linear portion 132b can move linearly in the direction of the arrow P9 being guided by the pin 133 and does not flex in the direction of the arrow P13. As the disc magazine case 40 moves further in the direction of the arrow P13, the tip portion of the shutter lever 63 abuts against the engaging portion 131b of the opening hook 131 as shown in FIG. 40c and, as the disc magazine case 40 moves further in the direction of the arrow P13, the shutter plate 45 is rotated in the direction of the arrow P5 so that the slot 62 is brought into register with the laser beam slot 66 so that the laser beam slot 66 is opened. In the above described manner, the disc magazine case 40 ceases its movement in the direction of the arrow P13 at the time point at which the laser beam slot 66 has been opened and thereafter is lowered on the turntable 61 and placed in the playback position.

In the ejecting operation of the disc magazine case 40, the disc magazine case 40 is moved in the direction of the arrow P14 as shown in FIG. 40d. The tip portion of the shutter lever 63 engages with the engaging portion 132c of the closing hook 132 and this causes the shutter plate 45 to be rotated in the direction of the arrow P6 to close the laser beam slot 66. As the disc magazine case 40 further moves in the direction of the arrow P14, the shutter lever 63 rides over the engaging portion 132c of the closing hook 132. At this time, the closing hook 132 moves in the direction of the arrow P9 with its curved portion 132a being elastically deformed. Thus the disc magazine case 40 is restored to the original position in a state in which the laser beam slot 66 is closed.

Since, as described above, the closing hook 132 among the hooks 131 and 132 engaging with the shutter lever 63 can move in the direction of the arrow P9, loading of the disc magazine case 40 can be carried out without trouble even in a case where the disc magazine case 40 is inserted in a state in which the laser beam slot 66 of the disc magazine case 40 is opened.

Figure 41A:
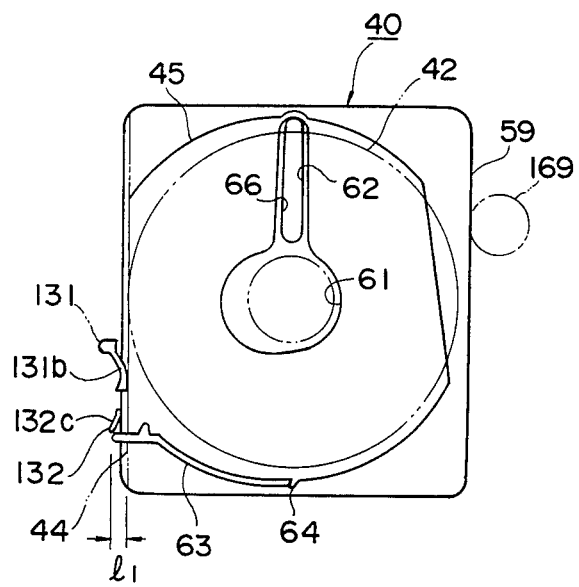

If the laser beam slot 66 of the disc magazine case 40 is opened, the tip portion of the shutter lever 63 projects, as shown in FIG. 41a, from the magazine frame 44 by a distance $l_1$. This distance $l_1$ is somewhat longer than a distance $l_2$ at the time the laser beam slot 66 is closed as shown in FIG. 40 due to relative positions of the pin 64 about which the shutter lever 63 rotates and the tip portion of the shutter lever 63. If, accordingly, the closing hook 132 was unable to move in the direction of the arrow P9 and fixed in its position, the tip portion of the shutter lever 63 would abut against the engaging portion 132c of the closing hook 132 and would be prevented from further movement when the disc magazine case 40 has been inserted with the laser beam slot 66 being opened whereby the loading of the disc magazine case 40 would be impossible.

Figure 41B:
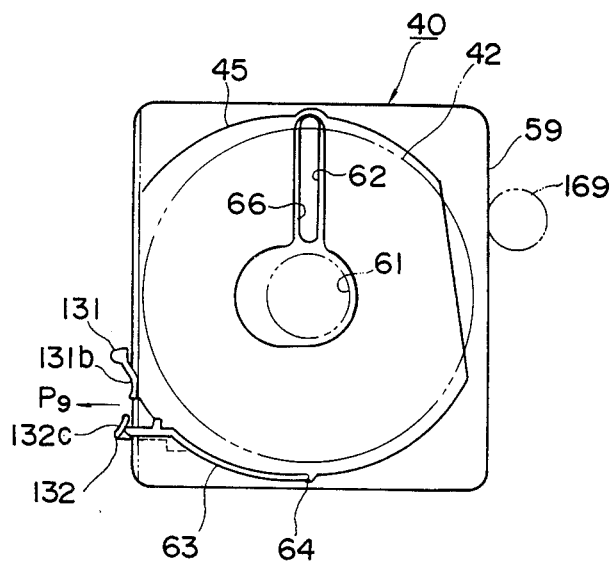

In the device according to the invention, even if the disc magazine case 40 is inserted with the laser beam slot 66 being opened, the closing portion 132c of the closing hook 132 is displaced in the direction of the arrow P9 against the tip portion of the shutter lever 63 which projects by a distance $l_2$ as shown in FIG. 41b so that the loading operation can be smoothly effected.

What is claimed is:

1. A disc loading device in a disc playback device comprising:
   a turntable for rotating a disc thereon;
   a holder provided above said turntable for holding a disc or a case housing a disc and movable upwardly or downwardly with respect to said turntable;
   a carrier movable horizontally with respect to said holder for loading said disc or said case housing the disc into said holder or ejecting the same from said holder; and
   cam means, operative between said holder and said carrier, for moving said holder downwardly toward the turntable in the loading of said disc or said case housing the disc and moving said holder upwardly away from the turntable in the ejection of said disc or said case housing the disc as the carrier moves horizontally.

2. A disc loading means as defined in claim 1 wherein said cam device comprises:
   a projection provided on the lower surface of said holder and having a tapered lower surface; and
   means for defining a hole in said carrier in and out of which said projection of said holder is engaged and disengaged;
   the tapered surface of said projection sliding against the edge of said hole as said carrier moves horizontally with respect to said holder thereby varying distance between said holder and said carrier.

3. A disc loading device as defined in claim 2 wherein said holder is made of a metal material and said projection of said holder is formed of a plastic material by an outsetting forming process.

4. A disc loading device as defined in claim 3 wherein a plurality of said cam means are provided in different locations as viewed in a plan.

5. A disc loading device as defined in claim 1 further comprising a clamper provided on said holder and cooperating with said holder for fixing said disc moving downwardly during loading thereof and moving upwardly during ejection thereof to said turntable.

6. A disc loading device as defined in claim 5 further comprising means for urging said clamper towards said turntable.

7. A disc loading device as defined in claim 6 wherein said clamper comprises a spherical portion on the side of said turntable at which said clamper moves in a relative rotary movement with respect to said disc and through which said clamper clamps said disc to said turntable.

8. A disc loading device as defined in claim 7 wherein said clamper clamps said disc to said turntable through a subclamper provided in said case.

9. A disc loading device as defined in claim 8 wherein said spherical portion of said clamper is made of a steel ball.

10. A disc loading device in a disc playback device comprising:
    a turntable for rotating a disc thereon;
    a holder provided above said turntable for holding a disc or a case housing a disc, wherein said holder is movable upwardly or downwardly with respect to said turntable and is constrained from any movement other than said upward or downward movement;
    a carrier movable horizontally with respect to said holder for loading said disc or said case housing the disc into said holder or ejecting the same from said holder; and
    cam means for moving said holder downwardly toward the turntable during the loading of said disc or said case housing the disc and moving said holder upwardly away from the turntable during the ejection of said disc or said case housing the disc as the carrier moves horizontally.

* * * * *